United States Patent
Yang

(10) Patent No.: US 12,342,289 B2
(45) Date of Patent: Jun. 24, 2025

(54) METHOD OF POWER CONTROL FOR SIDELINK COMMUNICATION, V2X DEVICE AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 713 days.

(21) Appl. No.: 17/626,473

(22) PCT Filed: Jul. 11, 2019

(86) PCT No.: PCT/CN2019/095623
§ 371 (c)(1),
(2) Date: Jan. 11, 2022

(87) PCT Pub. No.: WO2021/003742
PCT Pub. Date: Jan. 14, 2021

(65) Prior Publication Data
US 2022/0286977 A1  Sep. 8, 2022

(51) Int. Cl.
*H04W 52/24* (2009.01)
*H04W 4/40* (2018.01)
(Continued)

(52) U.S. Cl.
CPC ............. *H04W 52/24* (2013.01); *H04W 4/40* (2018.02); *H04W 24/10* (2013.01); *H04W 52/383* (2013.01)

(58) Field of Classification Search
CPC ....... H04W 52/24; H04W 4/40; H04W 24/10; H04W 52/383; H04W 24/08; H04W 92/18; H04W 52/241; H04W 52/242
See application file for complete search history.

(56) References Cited

U.S. PATENT DOCUMENTS

2021/0410084 A1* 12/2021 Li ........................ H04W 52/265
2022/0110067 A1* 4/2022 Ryu ....................... H04W 24/08

FOREIGN PATENT DOCUMENTS

CN   105722200 A   6/2016
CN   106375930 A   2/2017
(Continued)

OTHER PUBLICATIONS

International Search Report of PCT/CN2019/095623 dated Mar. 26, 2020 with English translation, (4p).
(Continued)

*Primary Examiner* — Yuwen Pan
*Assistant Examiner* — Fatuma G Sherif
(74) *Attorney, Agent, or Firm* — Arch & Lake LLP; Hao Tan; Shen Wang

(57) ABSTRACT

The present disclosure provides a method of power control for Sidelink communication. The method includes: a first UE measures a reference signal sent by a second UE to obtain a measurement result; and the first UE reports, when a change value of the measurement result of the reference signal is greater than a threshold value, a measurement report of the reference signal to the second UE according to the measurement result of the reference signal, where the measurement report is used for power control performed by the second UE.

20 Claims, 7 Drawing Sheets

(51) Int. Cl.
  *H04W 24/10* (2009.01)
  *H04W 52/38* (2009.01)

(56) References Cited

FOREIGN PATENT DOCUMENTS

| CN | 108111278 A | 6/2018 |
| CN | 109257810 A | 1/2019 |
| CN | 109392069 A | 2/2019 |
| WO | 2015059834 A1 | 4/2015 |

OTHER PUBLICATIONS

Huawei et al., "Discussion on Sidelink Power Control", 3GPP TSG RAN1 Meeting #89, R1-1707036, Hangzhou, China, May 15-19, 2017, (3p).

First Office Action issued to Chinese Patent Application No. 201980001329.0 dated Oct. 21, 2021 with English translation, (20p).

Samsung, "On Sidelink Power Control", Discussion and Decision, 3GPP TSG RAN WG1 #97, R1-1906950, Reno, NV, May 13-17, 2019, (8p).

* cited by examiner

METHOD OF POWER CONTROL FOR SIDELINK COMMUNICATION, V2X DEVICE AND STORAGE MEDIUM

CROSS REFERENCE

The present application is a national phase application of International Application No. PCT/CN2019/095623, filed on Jul. 11, 2019, the entire contents of which are hereby incorporated by reference for all purposes.

TECHNICAL FIELD

The present disclosure relates to the field of mobile communication, and in particular to a method and apparatus of power control for Sidelink communication, a V2X device, and a storage medium.

BACKGROUND

Vehicle to Everything (V2X) is a new generation of information and communication technology that connects the vehicle to everything, where "V" represents the vehicle, "X" represents any object that interacts with the vehicle. Currently, "X" mainly represents the vehicle, human, traffic roadside infrastructure and network. The information modes of V2X interaction include vehicle to vehicle (V2V) interaction, vehicle to infrastructure (V2I) interaction, vehicle to Pedestrian (V2P) interaction, and Vehicle to Network (V2N) interaction. A Sidelink communication mode is introduced to satisfy the interaction between the vehicle and multiple objects, especially the direct communication between two User Equipments (UEs), which realizes addressing through the source identifier and target identifier of the Media Access Control (MAC) layer. Thus, no pre-connection is required between UEs before communication, so that the Sidelink communication can satisfy a faster and more efficient way of communication.

SUMMARY

The present disclosure provides a method and apparatus of power control for Sidelink communication, a V2X device, and a storage medium. The technical solution described is as follows.

According to a first aspect of embodiments of the present disclosure, there is provided a method of power control for Sidelink communication, applied to a first UE in V2X, including: obtaining, by the first UE, a measurement result by measuring a reference signal sent by a second UE; reporting, by the first UE, upon a variation value of the measurement result of the reference signal being greater than a threshold value, a measurement report of the reference signal to the second UE based on the measurement result of the reference signal. The measurement report is used for power control performed by the second UE. The variation value is used for indicating a change in the measurement result of the reference signal relative to a last reported measurement result.

According to a second aspect of embodiments of the present disclosure, there is provided a method of power control for Sidelink communication, applied to a second UE in V2X, including: sending, by the second UE, a reference signal to a first UE; receiving, by the second UE, a measurement report of the reference signal reported by the first UE, where the measurement report is reported by the first UE upon a variation value of a measurement result of the reference signal being greater than a threshold value, and the variation value is used for indicating a change in the measurement result of the reference signal relative to a last reported measurement result; and performing, by the second UE, power control during V2X communication based on the measurement report of the reference signal.

According to a third aspect of embodiments of the present disclosure, there is provided a V2X device. The V2X device includes a processor; and a transceiver connected to the processor. The processor is configured to load and execute executable instructions to implement the method of power control for Sidelink communication performed by the first UE according to the first aspect.

BRIEF DESCRIPTION OF THE DRAWINGS

In order to clarify the technical solutions in the embodiments of the present application, the accompanying drawings in the description of the embodiments will be briefly introduced below, which obviously only show some of the embodiments of the present application, and other accompanying drawings may be obtained without any inventive labor by a person of ordinary skill in the art based on these drawings.

DETAILED DESCRIPTION

Exemplary embodiments will be described in detail herein, examples of which are represented in the accompanying drawings. In the following description involving the accompanying drawings, unless otherwise indicated, the same numerals in the different accompanying drawings indicate the same or similar elements. The embodiments described in the following exemplary embodiments are not intended to represent all embodiments consistent with the present disclosure. Instead, they are merely examples of devices and methods that are consistent with some aspects of the present disclosure, as detailed in the appended claims.

The communication system and the service scenarios described in the embodiments of the present application are intended to illustrate the technical solutions more clearly and do not constitute a limitation of the technical solutions provided by the embodiments of present application. A person of ordinary skill in the art will know that as communication system evolve and new service scenarios emerge, the technical solutions provided by the embodiments of the present application are equally applicable to similar technical problems.

Figure 1:
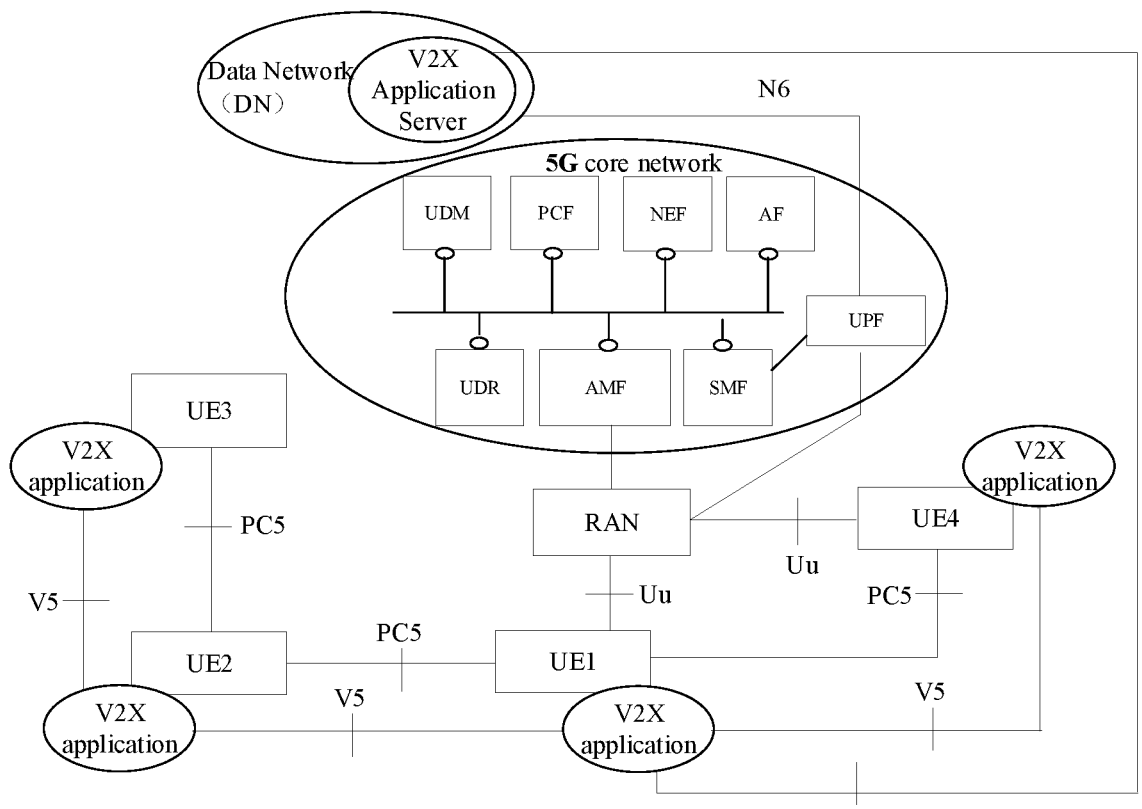
FIG. 1 illustrates a block diagram of a communication system provided by some embodiments of the present disclosure.

FIG. 1 illustrates a block diagram of a communication system provided by some embodiments of the present disclosure. The communication system may be a schematic diagram of a non-roaming 5G system architecture that may be applied to Vehicle to everything (V2X) services using Device-to-Device (D2D) technology.

The system architecture includes the Data Network (DN), which houses the V2X Application Server required for V2X services. The system architecture also includes the 5G core network, which has the following network functions: Unified Data Management (UDM), Policy Control Function (PCF), Network Exposure Function (NEF), Application Function (AF), Unified Data Repository (UDR), Access and Mobility Management Function (AMF), Session Management Function (SMF) and User Plane Function (UPF).

The system architecture also includes a New Generation-Radio Access Network (NG-RAN) and four exemplary user equipments (i.e., UE1 to UE4). Each user equipment is equipped with a V2X application. One or more access network devices, such as a base station (gNB), are provided in the NG-RAN.

In this system architecture, DN is connected to UE in the 5G core network via the PC-5 interface. A Sidelink connection is introduced to support direct communication between the UE and the UE. Since Sidelink transmissions are addressed via source identifier and target identifier of the Media Access Control layer, there is no need to establish a connection between the UE and the UE prior to transmission via the Sidelink connection.

Currently, in the 5th-Generation (5G) mobile communication technology, the power control function of Sidelink is introduced for unicast services of Sidelink communication in order to meet the Quality of Service (Qos) requirements for unicast data transmission during Sidelink communication. The UE configured to send the signal will adjust the transmitted power of the Sidelink signal according to the Sidelink channel measurement. The relevant formula is: $P_e = P_0 + \alpha \text{Pathloss}$.

$P_e$ represents the transmitted power, $P_0$ represents the transmitted power base, $\alpha$ represents the adjustment step and Pathloss represents the path loss of the Sidelink channel.

In the above related art, the path loss of the Sidelink channel is not available in a timely and accurate manner, making the power control of the Sidelink communication inaccurate.

In order to be able to support enhanced V2X services, i.e., to support higher transmission rates and higher reliability, a unicast connection over Sidelink is required, and in order to guarantee the QoS requirements for unicast data transmission, a Sidelink power control function is introduced in the Sidelink connection. In the Sidelink power control function, the path loss of the Sidelink channel varies depending on the distance between UEs, the filtering method or the information propagation medium, etc. Exemplary reference is made to the following embodiments for the compensation mechanism for path loss.

Figure 2:
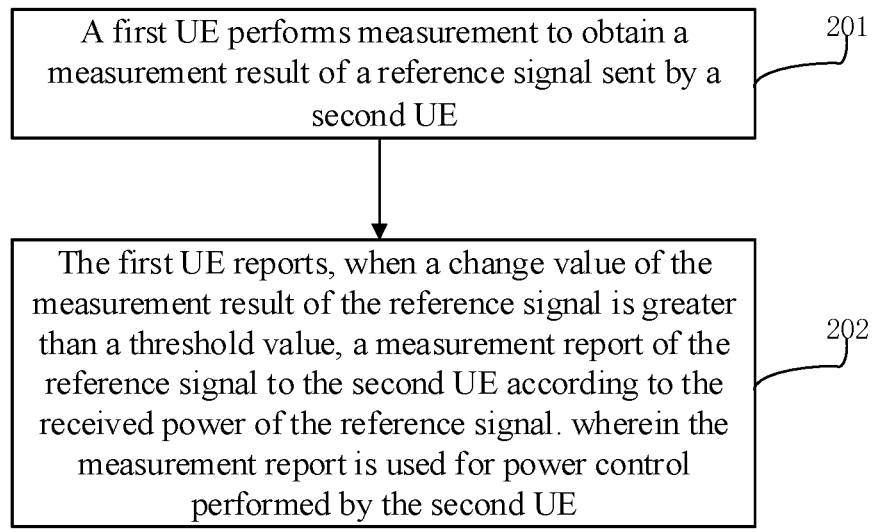
FIG. 2 illustrates a flowchart of a method of power control for Sidelink communication provided by some embodiments of the present disclosure.

FIG. 2 illustrates a flow chart of a method of power control for Sidelink communication provided by some embodiments of the present disclosure. The method may be performed by a first UE in the V2X (e.g., UE1 in FIG. 1), the method including following steps.

At step 201, the first UE measures a reference signal sent by a second UE and obtains a measurement result.

The first UE is the user equipment at the receiving end, and the second UE is the user equipment at the sending end.

The first UE receives the reference signal from the second UE and performs the measurement. The signal type of the reference signal may be at least one of Sidelink Synchronization Signal (SLSS), Sidelink Channel State Information Reference Signal (Sidelink CSI-RS), and Demodulation Reference Signal (DMRS).

The first UE may periodically receive the reference signal from the second UE and perform measurements.

The measurement result of the reference signal includes, but is not limited to, at least one of: the received power of the reference signal, the signal to noise ratio of the reference signal, and the signal to interference and noise ratio of the reference signal. This embodiment is illustrated by the example that the measurement result of the reference signal is the received power of the reference signal.

At step 202, the first UE reports, upon a variation value of the measurement result of the reference signal being greater than a threshold value, a measurement report of the reference signal to the second UE based on the measurement result of the reference signal. The measurement report is used for power control performed by the second UE.

After the measurement result of the reference signal have been obtained in this measurement, the first UE compares the measurement result of the reference signal obtained in this measurement with the last reported measurement result and obtains the variation value.

When the variation value is greater than the threshold value, the first UE reports the measurement report of the reference signal to the second UE based on the measurement result of the reference signal. The measurement report carries at least the measurement result of the reference signal.

Exemplarily, the first UE sends a first unicast Sidelink Radio Resource Control message to the second UE, where the first unicast Sidelink Radio Resource Control message includes a signal type of the reference signal and the measurement result after high-layer filtering.

In some embodiments, the measurement report also carries at least one of: the signal type of the reference signal, and the threshold value.

In summary, in the method provided by this embodiment, the first UE reports, upon the variation value of the measurement result of the reference signal being greater than the threshold value, the measurement report of the reference signal to the second UE based on the measurement result of the reference signal, which enables the second UE to perform power control during V2X communication based on the measurement report of the reference signal, improves the accuracy of the transmitted power control performed by the second UE (i.e., the UE at the sending end) during V2X communication, and reduces the impact of the path loss of the Sidelink channel on the communication between user equipments.

Figure 3:
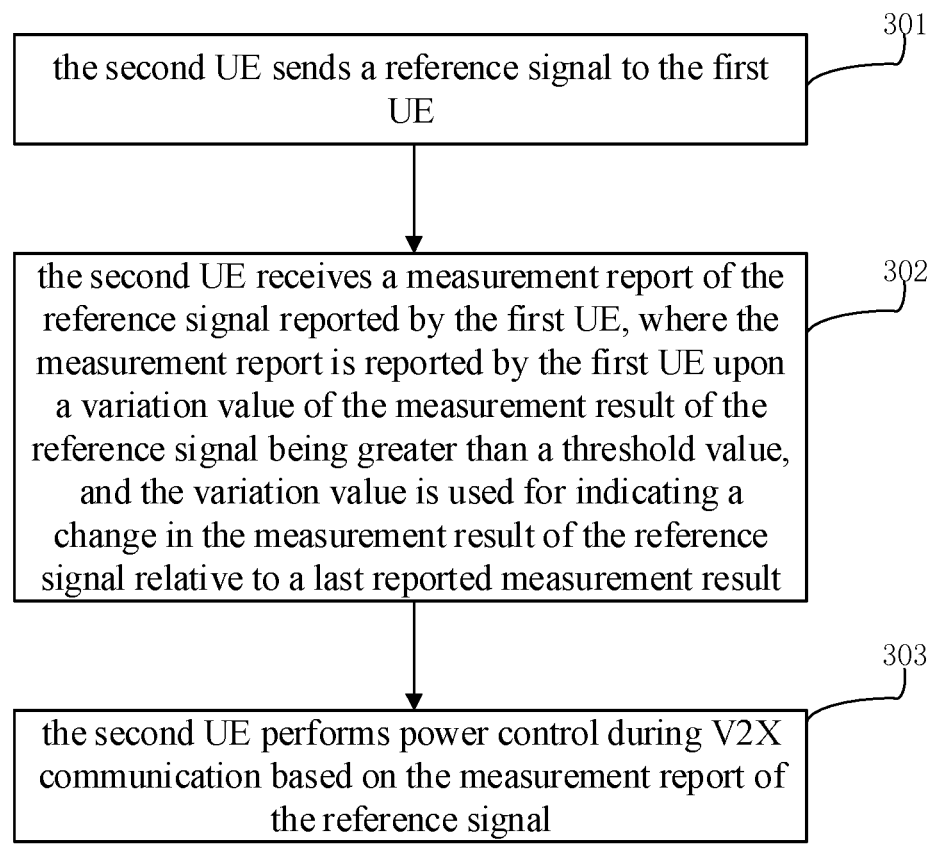
FIG. 3 illustrates a flow chart of a method of power control for Sidelink communication provided by some embodiments of the present disclosure.

FIG. 3 illustrates a flow chart of a method of power control for Sidelink communication provided by some embodiments of the present disclosure. The method may be performed by a second UE in the V2X (e.g., UE2 in FIG. 1), including the following steps.

At step 301, the second UE sends a reference signal to the first UE.

The signal type of the reference signal may be at least one of: SLSS, Sidelink CSI-RS, and DMRS.

At step 302, the second UE receives a measurement report of the reference signal reported by the first UE. The measurement report is reported by the first UE upon a variation value of the measurement result of the reference signal being greater than a threshold value, and the variation value is used for indicating a change in the measurement result of the reference signal relative to a last reported measurement result.

Exemplarily, the second UE receives a first unicast Sidelink RRC message from the first UE, and the first unicast Sidelink RRC message includes a signal type of the reference signal and the measurement result after high-layer filtering.

At step 303, the second UE performs power control during V2X communication based on the measurement report of the reference signal.

In summary, in the method provided by this embodiment, the second UE sends the reference signal to the first UE, receives the measurement report of the reference signal reported by the first UE, and performs power control during V2X communication based on the measurement report of the reference signal, which enables the second UE to perform power control during V2X communication based on the measurement report of the reference signal, improves the accuracy of the transmitted power control performed by the second UE (i.e., the UE at the sending end) during V2X communication, and reduces the impact of the path loss of the Sidelink channel on the communication between user equipments.

Figure 4:
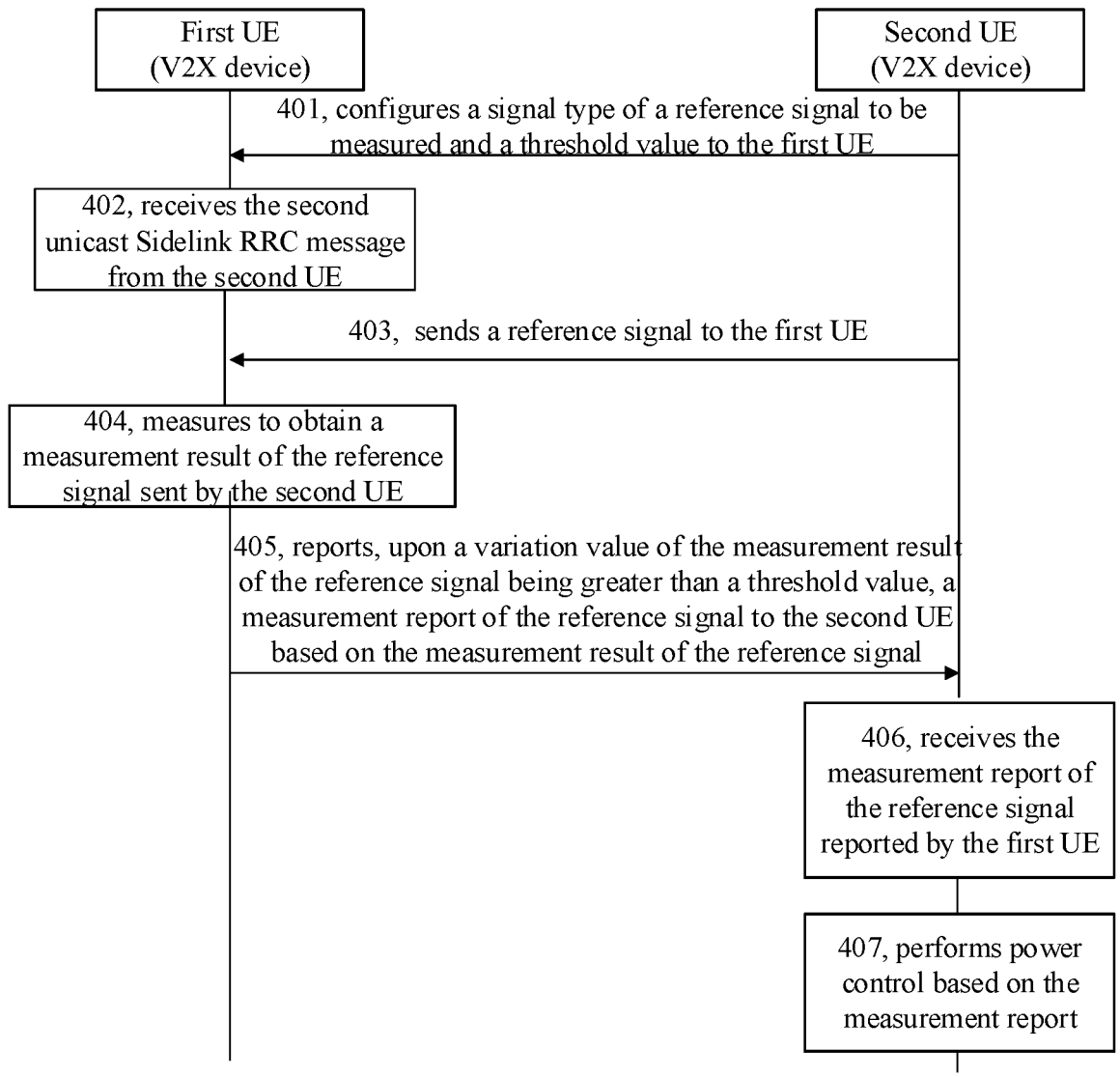
FIG. 4 illustrates a flow chart of a method of power control for Sidelink communication provided by some embodiments of the present disclosure.

FIG. 4 is a flow chart of a method of power control for Sidelink communication provided in accordance with some embodiments of the present disclosure. The method may be performed by a first UE and a second UE in V2X (e.g., UE1 and UE2 in FIG. 1), including the following steps.

At step 401, the second UE configures to the first UE a signal type of a reference signal to be measured and a threshold value.

The second UE configures to the first UE the signal type of the reference signal to be measured and the threshold value.

Exemplarily, the signal type of the reference signal is at least one of: SLSS, Sidelink CSI-RS, and DMRS. The second UE configures to the first UE the signal type of the reference signal which needs to be measured and the threshold value.

For example, the second UE configures to the first UE that the signal type of the reference signal which needs to be measured is DMRS and the threshold value is 3 db.

Exemplarily, the second UE sends a second unicast Sidelink RRC message to the first UE and the second unicast Sidelink RRC message includes the signal type of the reference signal to be measured and the threshold value.

At step 402, the first UE receives the signal type of the reference signal to be measured and threshold value configured by the second UE.

Exemplarily, the first UE receives the second unicast Sidelink RRC message from the second UE, and the second unicast Sidelink RRC message includes the signal type of the reference signal to be measured and the threshold value.

It should be noted that the configuration process of steps 401 and 402 can also be performed in reverse, i.e., the signal type of the reference signal to be measured and threshold value may be configured by the first UE to the second UE, which is not limited by this embodiment.

At step 403, the second UE sends a reference signal to the first UE.

The second UE sends the reference signal to the first UE according to the configured signal type of the reference signal.

At step 404, the first UE measures to obtain a measurement result of the reference signal sent by the second UE.

The first UE may periodically receive the reference signal from the second UE and perform measurements.

The measurement result of the reference signal includes, but is not limited to, at least one of: the received power of the reference signal, the signal to noise ratio of the reference signal, and the signal to interference and noise ratio of the reference signal. This embodiment is illustrated by the example that the measurement result of the reference signal is the received power of the reference signal.

In some embodiments, the first UE may also perform a high-layer filtering of the measurement result of the reference signal. As an example, the measurement result of the reference signal is the received power of the reference signal.

At the upper layer of the first UE (e.g., layer L3), the measurement result is filtered using the following formula: $F_n=(1-a)*F_{n-1}+a*M_n$.

$M_n$ represents the most recent measurement result, $F_{n-1}$ represents the filtered measurement result before the update, $F_n$ represents the filtered measurement result after the update, $a=\frac{1}{2}^{(k_i/4)}$, and $k_i$ is the configuration value.

At step 405, the first UE reports, upon a variation value of the measurement result of the reference signal being greater than a threshold value, a measurement report of the reference signal to the second UE based on the measurement result of the reference signal.

At step 406, the second UE receives the measurement report of the reference signal reported by the first UE.

The second UE receives the measurement report of the reference signal reported by the first UE when the variation value of the measurement result of the reference signal is greater than the threshold value. Exemplarily, the measurement report of the reference signal includes: the measurement result of the reference signal and optionally, the measurement report of the reference signal also includes: the signal type of the reference signal.

At step 407, the second UE performs power control based on the measurement report.

The second UE determines the path loss based on the difference between the transmitted power and received power of the reference signal and determines the transmitted power during the V2X communication based on the path loss.

Here, the transmitted power of the reference signal is the transmitted power used by the second UE in step 403.

In summary, in the method provided by this embodiment, after the second UE configures the threshold value and the signal type of the reference signal, the second UE sends the reference signal to the first UE, and the first UE monitors the subsequent signals of the second UE in real time according to the reference signal and sends, when the variation value exceeds the threshold value, a feedback message to compensate for the path loss. In addition, the configuration of the reference signal type and threshold value performed by the second UE allows the second UE to select the reference signal type and threshold value by itself, satisfying the purpose of the second UE to use the Sidelink control method dynamically according to its own performance and needs. For example, a relatively small threshold value is configured when frequent adjustment of the transmitted power is desired, and a relatively large threshold value is configured when lower frequency adjustment of the transmit power is desired.

The steps performed by the first UE in the above embodiment can be implemented separately as a method of power control for Sidelink communication on the side of the first UE, and the steps performed by the second UE can be implemented separately as a method of power control for Sidelink on the side of the second UE.

Figure 5:
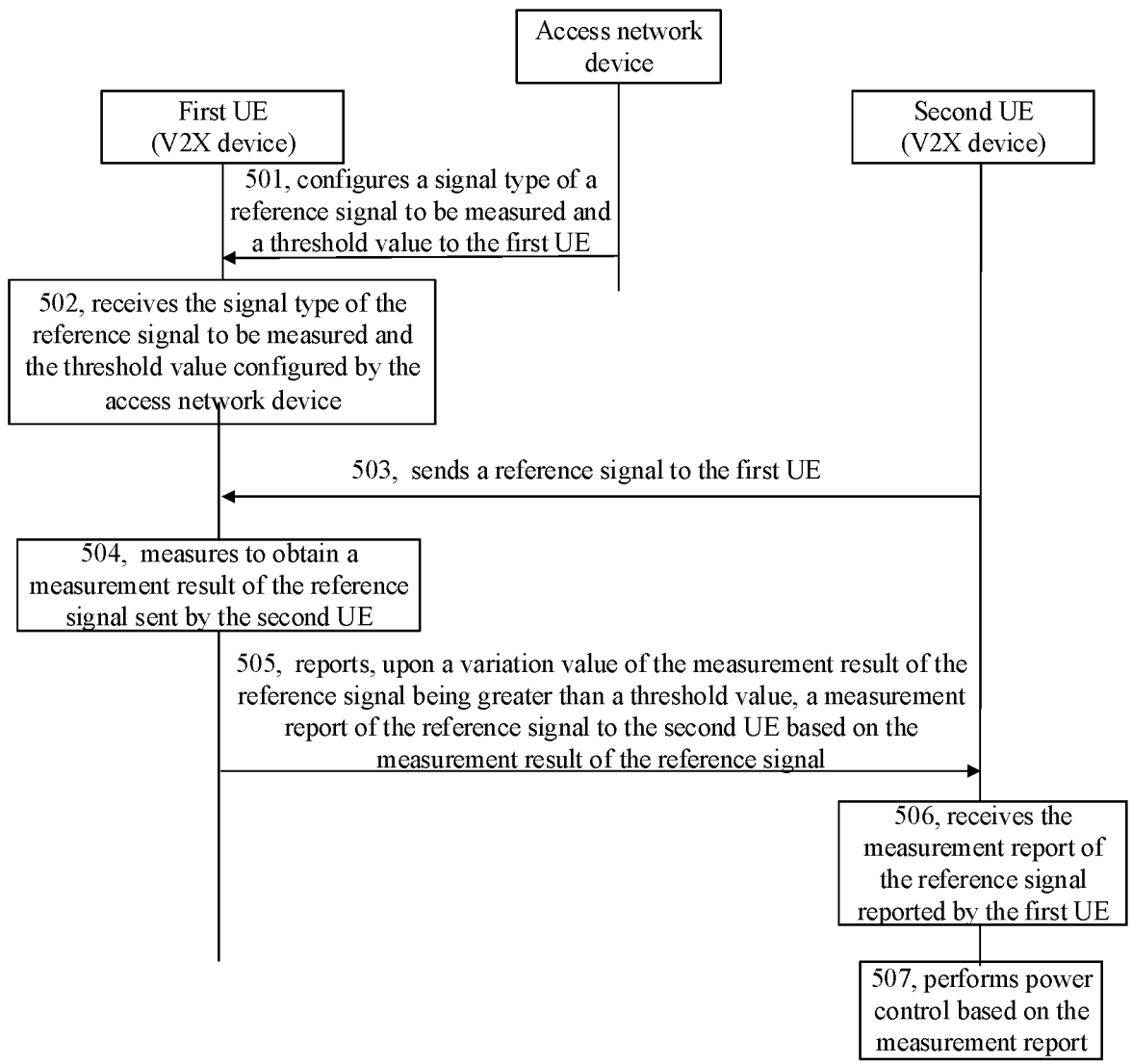
FIG. 5 illustrates a flow chart of a method of power control for Sidelink communication provided by some embodiments of the present disclosure.

FIG. 5 is a flow chart of a method of power control for Sidelink communication provided in accordance with some embodiments of the present disclosure. The method may be performed by a first UE and a second UE in V2X (e.g., UE1 and UE2 in FIG. 1), including following steps.

At step 501, the access network device configures a signal type of a reference signal and a threshold value to the first UE.

The access network device configures to the first UE the signal type of the reference signal to be measured and the threshold value.

In some embodiments, the access network device sends a broadcast signaling, which carries the signal type of the reference signal to be measured and the threshold value; or, the access network device sends a dedicated signaling, which carries the signal type of the reference signal to be measured and the threshold value. The dedicated signaling is a control signaling sent only to the first UE.

At step 502, the first UE receives the signal type of the reference signal to be measured and the threshold value configured by the access network device.

The first UE receives the broadcast signaling or dedicated signaling from the access network device, and the broadcast signaling or dedicated signaling carries the signal type of the reference signal to be measured and the threshold value.

It should be noted that the access network device may also configure the signal type of the reference signal and the threshold value to the second UE, and the second UE receives the signal type of the reference signal to be measured and the threshold value configured by the access network device.

At step 503, the second UE sends a reference signal to the first UE.

The second UE sends the reference signal to the first UE according to the configured signal type of the reference signal.

At step 504, the first UE measures to obtain a measurement result of the reference signal sent by the second UE.

The first UE may periodically receive the reference signal from the second UE and perform measurements.

The measurement result of the reference signal includes, but is not limited to, at least one of: the received power of the reference signal, the signal to noise ratio of the reference signal, and the signal to interference and noise ratio of the reference signal. This embodiment is illustrated by the example that the measurement result of the reference signal is the received power of the reference signal.

In some embodiments, the first UE may also perform a high-layer filtering of the measurement result of the reference signal. As an example, the measurement result is the received power of the reference signal.

At the upper layer of the first UE (e.g., layer L3), the measurement result is filtered using the following formula: $F_n$ $(1-a)*F_{n-1}+a*M_n$.

$M_n$ represents the most recent measurement result, $F_{n-1}$ represents the filtered measurement result before the update, $F_n$ represents the filtered measurement result after the update, $a=\frac{1}{2}^{(ki/4)}$, and $k_i$ is the configuration value.

At step 505, the first UE reports, upon a variation value of the measurement result of the reference signal being greater than a threshold value, a measurement report of the reference signal to the second UE based on the measurement result of the reference signal.

At step 506, the second UE receives the measurement report of the reference signal reported by the first UE.

The second UE receives the measurement report of the reference signal reported by the first UE when the variation value of the measurement result of the reference signal is greater than the threshold value. Exemplarily, the measurement report of the reference signal includes: the measurement result of the reference signal and optionally, the measurement report of the reference signal also includes: the signal type of the reference signal.

At step 507, the second UE performs power control based on the measurement report.

The second UE determines the path loss based on the difference between the transmitted power and received power of the reference signal and determines the transmitted power during the V2X communication based on the path loss.

In summary, in the method provided by this embodiment, after the access network device configures the threshold value and reference signal type, the second UE sends the reference signal to the first UE. The configuration of threshold value and reference signal type is performed by the access network device, either by means of broadcast signaling for large-scale channel configuration or by means of dedicated signaling for a specific UE, satisfying the requirements for use at the operator level.

Figure 6:
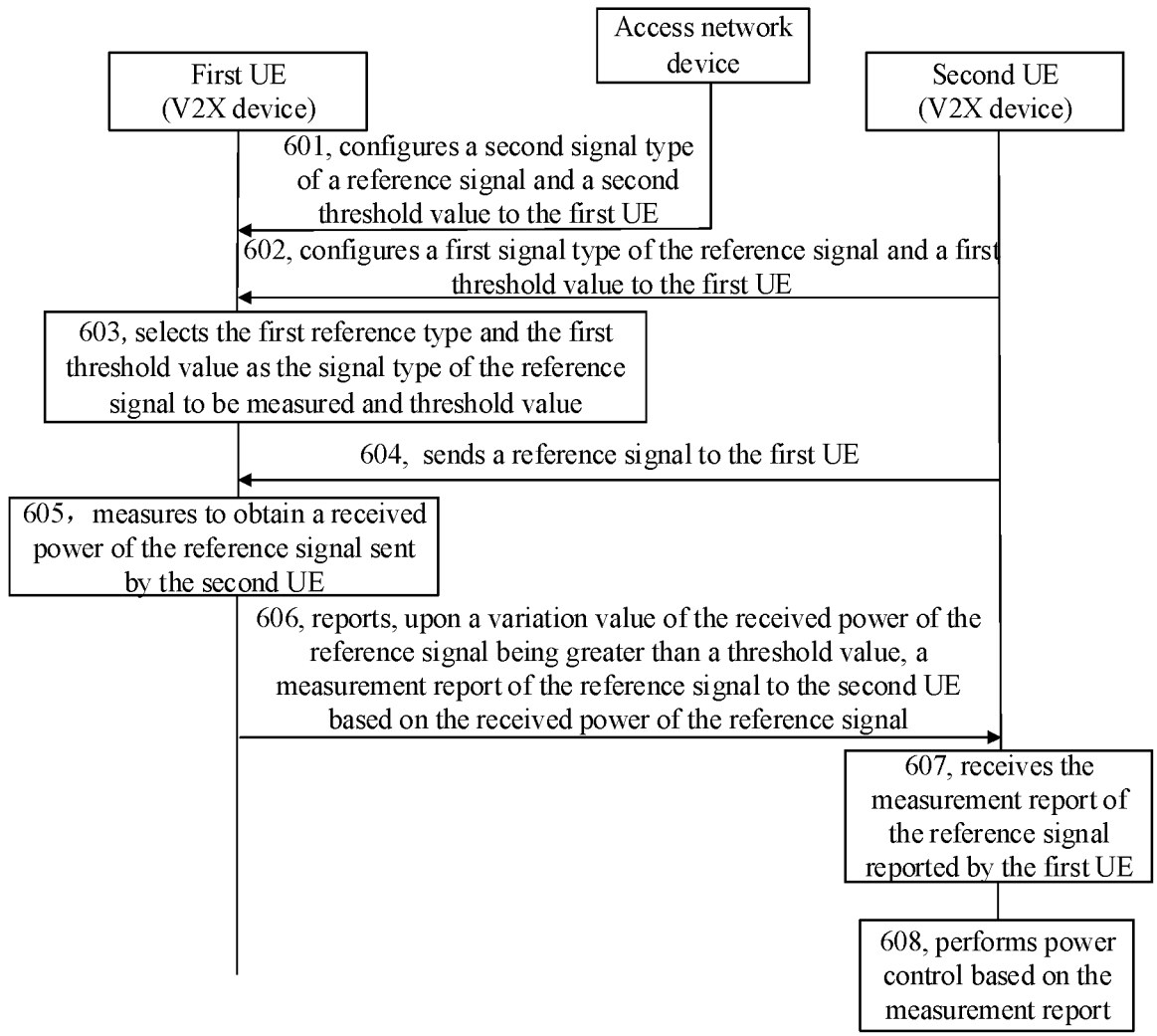
FIG. 6 illustrates a flow chart of a method of power control for Sidelink communication provided by some embodiments of the present disclosure.

FIG. 6 is a flow chart of a method of power control for Sidelink communication provided in accordance with some embodiments of the present disclosure. The method may be performed by a first UE and a second UE in V2X (e.g., UE1 and UE2 in FIG. 1), including the following steps.

At step 601, the access network device configures a second signal type of the reference signal and a second threshold value to the first UE.

The access network device configures to the first UE the second signal type of the reference signal to be measured and the second threshold value.

In some embodiments, the access network device sends a broadcast signaling, which carries the second signal type of the reference signal to be measured and the second threshold value; or, the access network device sends a dedicated signaling, which carries the second signal type of the reference signal to be measured and the second threshold value. The dedicated signaling is a control signaling sent only to the first UE.

Correspondingly, the first UE receives the second signal type of the reference signal to be measured and the second threshold value configured by the access network device. The first UE receives the broadcast signaling or dedicated signaling from the access network device, and the broadcast signaling or dedicated signaling carries the second signal type of the reference signal to be measured and the second threshold value.

It should be noted that the access network device may also configure the second signal type of the reference signal and the second threshold value to the second UE, and the second UE receives the second signal type of the reference signal to be measured and the second threshold value configured by the access network device.

At step 602, the second UE configures a first signal type of the reference signal and a first threshold value to the first UE.

Exemplarily, the second UE sends a second unicast Sidelink RRC message to the first UE, and the second unicast Sidelink RRC message includes the first signal type of the reference signal to be measured and the first threshold value.

Correspondingly, the first UE receives the first signal type of the reference signal to be measured and the first threshold value configured by the second UE. Exemplarily, the first UE receives the second unicast Sidelink RRC message from the second UE, and the second unicast Sidelink RRC message includes the first signal type of the reference signal to be measured and the first threshold value.

It should be noted that the configuration process of step 602 can also be performed in reverse, i.e., the first signal type of the reference signal to be measured and the first threshold value are configured by the first UE to the second UE, which is not limited by this embodiment.

At step 603, the first UE selects the first reference type and the first threshold value as the signal type of the reference signal to be measured and threshold value.

When both the UE and the access network device configure the signal type and the threshold, the first UE selects the first signal type and the first threshold configured (or selected) by the UE as the signal type of the reference signal to be measured and threshold.

At step 604, the second UE sends a reference signal to the first UE.

The second UE sends the reference signal to the first UE according to the configured signal type of the reference signal.

At step 605, the first UE measures to obtain a measurement result of the reference signal sent by the second UE.

The first UE may periodically receive the reference signal from the second UE and perform measurements.

The measurement result of the reference signal includes, but is not limited to, at least one of: the received power of the reference signal, the signal to noise ratio of the reference signal, and the signal to interference and noise ratio of the reference signal. This embodiment is illustrated by the example that the measurement result of the reference signal is the received power of the reference signal.

In some embodiments, the first UE may also perform a high-layer filtering of the measurement result of the reference signal. As an example, the measurement result is the received power of the reference signal.

At the upper layer of the first UE (e.g., layer L3), the measurement result is filtered using the following formula: $F_n (1-a)*F_{n-1}+a*M_n$.

$M_n$ represents the most recent measurement result, $F_{n-1}$ represents the filtered measurement result before the update, $F_n$ represents the filtered measurement result after the update, $a=\frac{1}{2}^{(ki/4)}$, and $k_i$ is the configuration value.

At step 606, the first UE reports, upon a variation value of the measurement result of the reference signal being greater than a threshold value, a measurement report of the reference signal to the second UE based on the measurement result of the reference signal.

The second UE receives the measurement report of the reference signal reported by the first UE when the variation value of the measurement result of the reference signal is greater than the threshold value. Exemplarily, the measurement report of the reference signal includes: the measurement result of the reference signal and optionally, the measurement report of the reference signal also includes: the signal type of the reference signal.

At step 607, the second UE receives the measurement report of the reference signal reported by the first UE.

When the variation value of the measurement result of the reference signal is greater than the threshold value, the second UE receives the measurement report of the reference signal reported by the first UE, which includes the measurement result with the variation value above the variation value and the signal type of the measurement result.

At step 608, the second UE performs power control based on the measurement report.

The second UE determines the path loss based on the difference between the transmitted power and received power of the reference signal and determines the transmitted power during the V2X communication based on the path loss.

In summary, in the method provided by this embodiment, after both the UE and the access network device configure the threshold value and the reference signal type, the first UE preferentially selects the signal type of the reference signal and the threshold value configured by the UE, which enables quick communication between the UEs to be guaranteed in priority.

Figure 7:
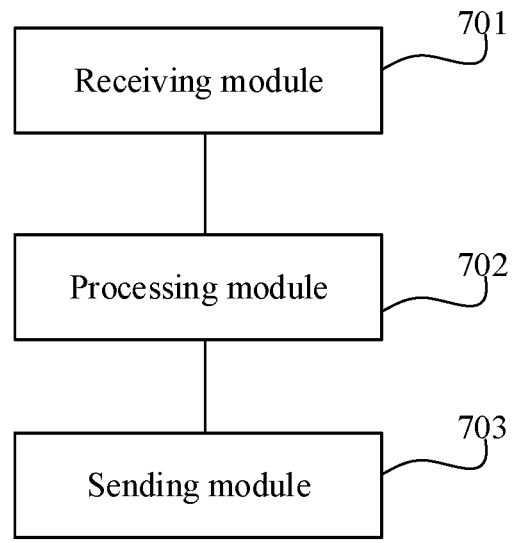
FIG. 7 illustrates a structural schematic diagram of an apparatus of power control for Sidelink communication provided by some embodiments of the present disclosure.

FIG. 7 is a structural schematic diagram of an apparatus of power control for Sidelink communication provided by some embodiments of the present disclosure. This apparatus may be implemented as all or part of a first UE by software, hardware, or a combination of both, and includes a receiving module 701, a processing module 702, and a sending module 703.

The receiving module 701 is configured to obtain a measurement result by measuring a reference signal sent by a second UE.

The sending module 703 is configured to report, upon a variation value of the measurement result of the reference signal being greater than a threshold value, a measurement report of the reference signal to the second UE based on the measurement result of the reference signal, the measurement report being used for power control performed by the second UE.

In some embodiments, the sending module 703 is configured to send, upon the variation value of the measurement result of the reference signal being greater than the threshold value, a first unicast Sidelink RRC message to the second UE, where the first unicast Sidelink RRC message includes a signal type of the reference signal and higher layer filtered measurement result.

In some embodiments, the receiving module 701 is configured to receive a signal type of the reference signal and the threshold value configured by the second UE before receiving the reference signal from the second UE.

In some embodiments, the receiving module 701 is configured to receive a second unicast Sidelink RRC message from the second UE, where the second unicast Sidelink RRC message includes the signal type of the reference signal and the threshold value.

In some embodiments, the receiving module 701 is configured to receive a signal type of the reference signal and the threshold value configured by an access network device before receiving the reference signal from the second UE.

In some embodiments, the receiving module 701 is configured to receive a broadcast signaling from the access network device, where the broadcast signaling includes the signal type of the reference signal and the threshold value; or the receiving module 701 is configured to receive a dedicated signaling from the access network device, where the dedicated signaling includes the signal type of the reference signal and the threshold value.

In some embodiments, the receiving module 701 is configured to receive a first signal type and a first threshold value configured by the second UE before receiving the reference signal from the second UE; and the receiving module 701 is configured to receive a second signal type and a second threshold value configured by an access network device before receiving the reference signal from the second UE. The processing module 702 is configured to determine the first signal type as a signal type of the reference signal and determine the first threshold as the threshold.

In some embodiments, a signal type of the reference signal includes at least one of following types: SLSS, Sidelink CSI-RS, and DMRS.

Figure 8:
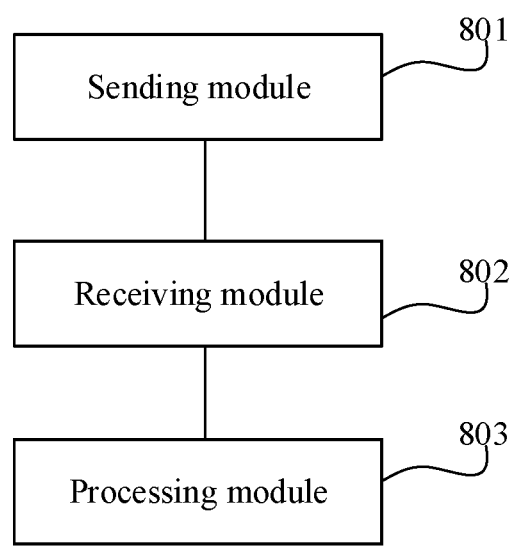
FIG. 8 illustrates a structural schematic diagram of an apparatus of power control for Sidelink communication provided by some embodiments of the present disclosure.

FIG. 8 is a structural schematic diagram of an apparatus of power control for Sidelink communication provided by some embodiments of the present disclosure. This apparatus may be implemented as all or part of a second UE by software, hardware, or a combination of both, and includes as follows.

A sending module 801 is configured to send a reference signal to a first UE.

A receiving module 802 is configured to receive a measurement report of the reference signal reported by the first UE. The measurement report is reported by the first UE upon a variation value of a measurement result of the reference signal being greater than a threshold value, and the variation value is used for indicating a change in the measurement result of the reference signal relative to a last reported measurement result.

A processing module 803 is configured to perform power control during V2X communication based on the measurement report of the reference signal.

In some embodiments, the receiving module 802 is configured to receive a first unicast Sidelink RRC message from the first UE, where the first unicast Sidelink RRC message includes a signal type of the reference signal and higher layer filtered measurement result.

In some embodiments, the processing module 803 is configured to configure a signal type of the reference signal and the threshold value to the first UE before sending the reference signal to the first UE.

In some embodiments, the sending module 801 is configured to send a second unicast Sidelink RRC message to the first UE, where the second unicast Sidelink RRC message includes the signal type of the reference signal and the threshold value.

In some embodiments, a signal type of the reference signal includes at least one of following types SLSS, Sidelink CSI-RS, and DMRS.

Figure 9:
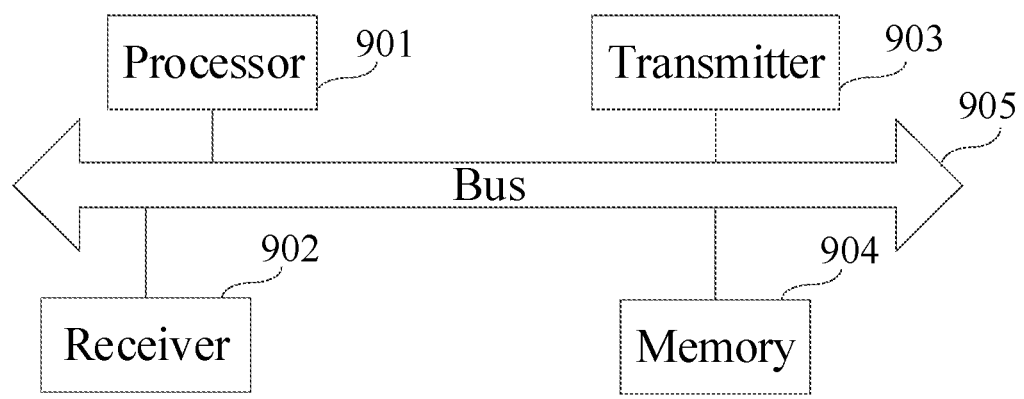
FIG. 9 illustrates a structural schematic diagram of a V2X device provided by some embodiments of the present disclosure.

FIG. 9 illustrates a structural schematic diagram of a V2X device (or V2X sending terminal, V2X receiving terminal) provided by an exemplary embodiment of the present disclosure. The V2X device includes as follows.

A processor 901 includes one or more processing cores, and the processor 901 executes various functional applications and information processing by running software programs and modules.

A receiver 902 and a transmitter 903 may be implemented as a communication component, and the communication component may be a communication chip.

A memory 904 is connected to the processor 901 through a bus 905.

The memory 904 may be configured to store at least one instruction, and the processor 901 may configured to execute the at least one instruction to implement each step of the foregoing method described in the embodiments.

An exemplary embodiment of the present disclosure also provides a computer-readable storage medium in which at least one instruction, at least one segment of a program, a code set, or an instruction set is stored. The at least one instruction, the at least one segment of a program, the code set, or the instruction set is loaded and executed by the processor to implement the method of power control for Sidelink communication provided by the foregoing embodiments.

It should be understood that the term "plurality" mentioned herein refers to two or more. The term "and/or" describes the relationship of the associated objects and indicates that there may be three relationships, for example, A and/or B, which can mean: A alone, both A and B, and B alone. The character "/" generally indicates that the associated objects before and after are in an "or" relationship.

Other embodiments of the present disclosure will readily be anticipated by those skilled in the art upon consideration of the specification and practice of the invention disclosed herein. The present disclosure is intended to cover any variation, use or adaptation of the present disclosure that follows the general principles of the present disclosure and includes means that are common knowledge or customary in the art not disclosed herein. The description and embodiments are intended to be exemplary only and the true scope and spirit of the present disclosure is indicated by the following claims.

It should be understood that the present disclosure is not limited to the precise construction already described above and illustrated in the accompanying drawings, and that various modifications and changes may be made without departing from its scope. The scope of the present disclosure is limited only by the appended claims.

What is claimed is:

1. A method of power control for Sidelink communication, comprising:
   obtaining, by a first User Equipment (UE) in Vehicle to Everything (V2X), a measurement result by measuring a reference signal sent by a second UE; and
   reporting, by the first UE, upon a variation value of the measurement result of the reference signal being greater than a threshold value, a measurement report of the reference signal to the second UE based on the measurement result of the reference signal, the measurement report being used for power control performed by the second UE,
   wherein the variation value indicates a change in the measurement result of the reference signal relative to a last reported measurement result; and
   wherein the method further comprises:
   receiving, by the first UE, a first signal type of the reference signal and a first threshold value configured by the second UE before receiving the reference signal from the second UE.

2. The method of claim 1, wherein reporting the measurement report of the reference signal to the second UE based on the measurement result of the reference signal comprises:
   sending a first unicast Sidelink Radio Resource Control (RRC) message to the second UE, wherein
   the first unicast Sidelink RRC message comprises a signal type of the reference signal and higher layer filtered measurement result.

3. The method of claim 1, further comprising:
   wherein receiving, by the first UE, the first signal type of the reference signal and the first threshold value configured by the second UE comprises:
   receiving, by the first UE, a second unicast Sidelink Radio Resource Control (RRC) message from the second UE, wherein the second unicast Sidelink RRC message comprises the first signal type of the reference signal and the first threshold value.

4. The method of claim 1, further comprising:
receiving, by the first UE, a second signal type of the reference signal and a second threshold value configured by an access network device before receiving the reference signal from the second UE;
wherein receiving, by the first UE, the second signal type of the reference signal and the second threshold value configured by the access network device comprises at least one of following steps:
receiving, by the first UE, a broadcast signaling from the access network device, wherein the broadcast signaling comprises the second signal type of the reference signal and the second threshold value; or
receiving, by the first UE, a dedicated signaling from the access network device, wherein the dedicated signaling comprises the second signal type of the reference signal and the second threshold value.

5. The method of claim 1, further comprising:
receiving, by the first UE, the first signal type and the first threshold value configured by the second UE before receiving the reference signal from the second UE;
receiving, by the first UE, a second signal type and a second threshold value configured by an access network device before receiving the reference signal from the second UE; and
determining, by the first UE, the first signal type as a signal type of the reference signal and determining the first threshold value as the threshold value.

6. The method of claim 1, wherein a signal type of the reference signal comprises at least one of following types:
Sidelink Synchronization Signal (SLSS);
Sidelink Channel State Information Reference Signal (Sidelink CSI-RS); or
Demodulation Reference Signal (DMRS).

7. A non-transitory computer-readable storage medium, storing at least one instruction, at least one segment of a program, a code set or an instruction set, wherein
the at least one instruction, the at least one segment of a program, the code set or the instruction set is loaded and executed by a processor to implement the method of power control for Sidelink communication of claim 1.

8. A method of power control for Sidelink communication, comprising:
sending, by a second User Equipment (UE) in Vehicle to Everything (V2X), a reference signal to a first UE;
receiving, by the second UE, a measurement report of the reference signal reported by the first UE, wherein:
the measurement report is reported by the first UE upon a variation value of a measurement result of the reference signal being greater than a threshold value, and
the variation value indicates a change in the measurement result of the reference signal relative to a last reported measurement result; and
performing, by the second UE, power control during V2X communication based on the measurement report of the reference signal;
wherein the method further comprises:
configuring, by the second UE, a first signal type of the reference signal and a first threshold value to the first UE before sending the reference signal to the first UE.

9. The method of claim 8, wherein the second UE receiving the measurement report of the reference signal reported by the first UE comprises:
receiving, by the second UE, a first unicast Sidelink Radio Resource Control (RRC) message from the first UE, wherein
the first unicast Sidelink RRC message comprises a signal type of the reference signal and higher layer filtered measurement result.

10. The method of claim 8,
wherein the second UE configuring the first signal type of the reference signal and the first threshold value to the first UE comprises:
sending, by the second UE, a second unicast Sidelink RRC message to the first UE, wherein the second unicast Sidelink RRC message comprises the first signal type of the reference signal and the first threshold value.

11. The method of claim 10, wherein a signal type of the reference signal comprises at least one of following types:
Sidelink Synchronization Signal (SLSS);
Sidelink Channel State Information Reference Signal (Sidelink CSI-RS); or
Demodulation Reference Signal (DMRS).

12. A Vehicle to Everything (V2X) device, comprising:
a processor; and
a transceiver connected to the processor,
wherein the processor is configured to load and execute executable instructions to implement the method of power control for Sidelink communication of claim 8.

13. The V2X device of claim 12, wherein the processor is further configured to:
receive a first unicast Sidelink Radio Resource Control (RRC) message from the first UE, wherein the first unicast Sidelink RRC message comprises a signal type of the reference signal and higher layer filtered measurement result.

14. The V2X device of claim 12,
wherein the processor configures the first signal type of the reference signal and the first threshold value to the first UE by:
sending a second unicast Sidelink Radio Resource Control (RRC) message to the first UE, wherein the second unicast Sidelink RRC message comprises the first signal type of the reference signal and the first threshold value.

15. A Vehicle to Everything (V2X) device, comprising:
a processor; and
a transceiver connected to the processor,
wherein the processor is configured to load and execute executable instructions to:
obtain a measurement result by measuring a reference signal sent by a second UE; and
report, upon a variation value of the measurement result of the reference signal being greater than a threshold value, a measurement report of the reference signal to the second UE based on the measurement result of the reference signal, the measurement report being used for power control performed by the second UE,
wherein the variation value indicates a change in the measurement result of the reference signal relative to a last reported measurement result; and
wherein the processor is further configured to:
receive a first signal type of the reference signal and the first threshold value configured by the second UE before receiving the reference signal from the second UE.

16. The V2X device of claim 15, wherein the processor is further configured to:

send a first unicast Sidelink Radio Resource Control (RRC) message to the second UE, wherein the first unicast Sidelink RRC message comprises a signal type of the reference signal and high-layer filtered measurement result.

17. The V2X device of claim 15, wherein the processor is configured to receive the first signal type of the reference signal and the first threshold value configured by the second UE by:

receiving a second unicast Sidelink Radio Resource Control (RRC) message from the second UE, wherein the second unicast Sidelink RRC message comprises the first signal type of the reference signal and the first threshold value.

18. The V2X device of claim 15, wherein the processor is further configured to:

receive a second signal type of the reference signal and a second threshold value configured by an access network device before receiving the reference signal from the second UE;

wherein the processor is configured to receive the second signal type of the reference signal and the second threshold value configured by the access network device by at least one of following steps:

receiving a broadcast signaling from the access network device, wherein the broadcast signaling comprises the second signal type of the reference signal and the second threshold value; or receiving a dedicated signaling from the access network device, wherein the dedicated signaling comprises the second signal type of the reference signal and the second threshold value.

19. The V2X device of claim 15, wherein the processor is further configured to:

receive the first signal type and the first threshold value configured by the second UE before receiving the reference signal from the second UE;

receive a second signal type and a second threshold value configured by an access network device before receiving the reference signal from the second UE; and determine the first signal type as a signal type of the reference signal and determine the first threshold value as the threshold value.

20. The V2X device of claim 15, wherein a signal type of the reference signal comprises at least one of following types:

Sidelink Synchronization Signal (SLSS);
Sidelink Channel State Information Reference Signal (Sidelink CSI-RS); or
Demodulation Reference Signal (DMRS).

\* \* \* \* \*